Aug. 3, 1948.                J. HILLIER                    2,446,228
              INSTRUMENT FOR MEASURING AND INDICATING
                       ULTRA HIGH FREQUENCIES
                       Filed June 22, 1946
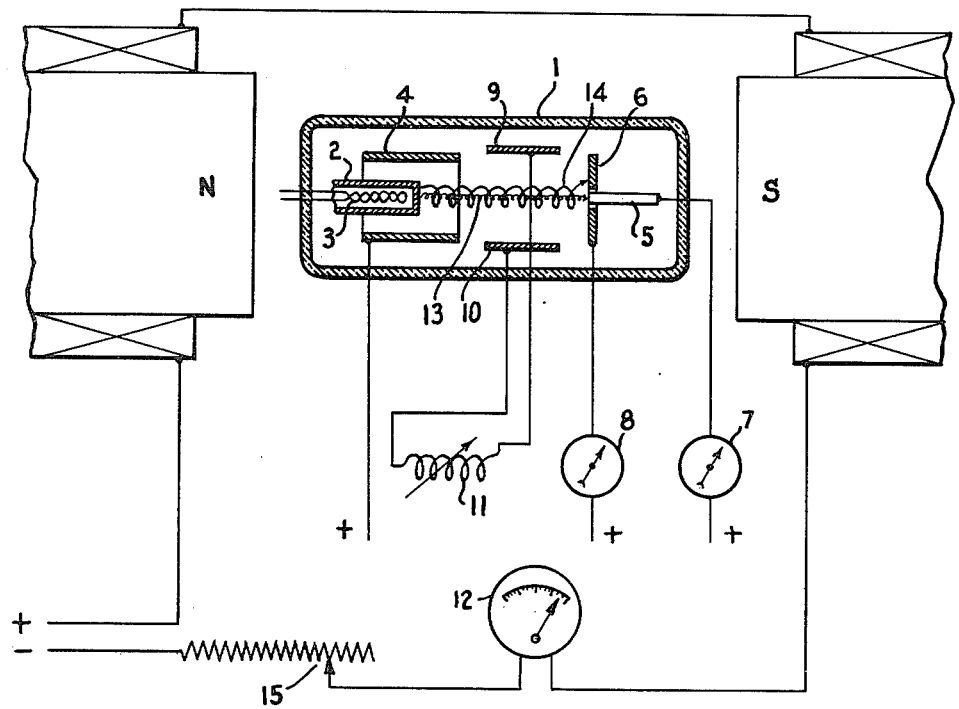
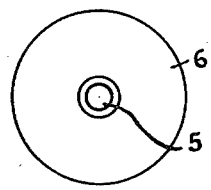
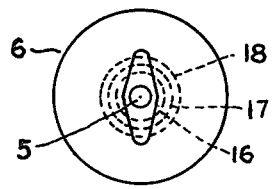
INVENTOR
JAMES HILLIER
BY
William A. Zalesak
ATTORNEY Patented Aug. 3, 1948

2,446,228

UNITED STATES PATENT OFFICE 2,446,228

INSTRUMENT FOR MEASURING AND INDICATING ULTRA HIGH FREQUENCIES

James Hillier, Cranbury, N. J., assignor to Radio Corporation of America, a corporation of Delaware Application June 22, 1946, Serial No. 678,560

4 Claims. (Cl. 315—10)

This invention relates to electrical measuring and indicating devices and it is an object of the invention to provide an instrument that will readily measure the frequency of radio waves of very high frequency, for example, from 1,000 up to 20,000 megacycles.

Another object of the invention is to provide an indicator of radio signals of ultra high frequency.

Other objects of the invention will appear in the following description, reference being had to the drawings, in which:

Figure 1 is a section of the improved indicating device.

Figure 2 is an enlarged end view of the targets of Figure 1.

Figure 3 is an enlarged end view of the targets of a modified form.

Referring to Figure 1, the indicating device consists of a suitable evacuated envelope 1 containing a cathode 2, which may be indirectly heated by heater 3. The cathode is surrounded by a cylindrical anode 4 for accelerating the electrons from the cathode to the targets. The targets consist of a central wire 5 of small diameter extending into a perforation in a disc target 6 of slightly larger diameter, so as to leave a thin annular space between the targets. These targets are connected through current indicating devices 7, 8 to a suitable potential, preferably lower than that applied to anode 4.

The envelope 1 is placed between two poles N and S of an electromagnet, so that the cathode ray beam is immersed in a strong axial magnetic focusing field. Plates 9 and 10, which in use constitute a radio antenna, are spaced apart inside envelope 1 so as to produce an electric field perpendicular to the magnetic focusing field by intercepting radio waves. For maximum sensitivity, plates 9 and 10 should be positioned correctly in reference to the polarization of the waves to be indicated and should be tuned as by connecting to the ends of an adjustable tuning coil 11.

The indicating instrument 12 may be calibrated so that the scale will indicate the frequency of rotation of the electrons around the electromagnetic lines of the field H from the equation $$f = \frac{H}{3.57} \times 10^7 \text{ C. P. S.}$$

In operating the instrument, if the received radiation is not of the same frequency as the frequency of rotation of the electrons, no net energy from the radio waves will be received by the electrons and the electrons of the beam will spiral at very small radii, as at 13, and land on the central target 5. If the radio waves have the same frequency as the frequency of rotation of the electrons around the magnetic lines, the electrons will receive energy therefrom, causing them to spiral at greater radius, as at 14, so that they land on target 6. Thus, by adjusting at 15 the ampere turns of the magnet NS, the frequency of rotation of the electrons may be equalized with the radio frequency. This condition will be indicated by the instruments 7 and 8. The frequency can then be read off the instrument 12.

In using the device as a signal indicator for Morse code signals, for example, the instruments will indicate the marks and spaces. The electrodes, as illustrated in Figure 2, are essentially an on-and-off indicator, but any type of response can be obtained by shaping the electrodes, for example as shown in Figure 3, where the space between the two targets is irregular, so that radii of increasing length from the center of target 5 will have increasing lengths of circumferential arcs 16, 17, 18, etc., defining the areas of target 6 bombarded by the electrons. Thus, the current from target 6 can be made to vary in amplitude with the amplitude of the received signal by proper shaping of the space between the two anodes.

Various types of radio antenna, known in the art, may be used to produce the electric field and various other modifications may be devised without departing from the spirit of the invention.

I claim:

1. A cathode ray beam tube comprising a cathode, a target, an anode for accelerating the electrons from said cathode toward said target, means for producing a magnetic focusing field between said cathode and said target normally focusing the electrons on said target, means for intercepting radio waves to produce an electric field perpendicular to said magnetic field, a second target around the first target and means for varying the strength of said magnetic field to equalize the frequency of rotation of the electrons around the magnetic lines with the frequency of the intercepted radio waves.

2. A cathode ray beam tube comprising a cathode, a target, an anode for accelerating the electrons from said cathode toward said target, means for producing a magnetic focusing field between said cathode and said target normally focusing the electrons on said target, means for intercepting radio waves to produce an electric field perpendicular to said magnetic field, means for tuning the second-mentioned means to the frequency of the radio waves to be received, a second target around the first target and means for varying the strength of said magnetic field to equalize the frequency of rotation of the electrons around the magnetic lines with the frequency of the intercepted radio waves.

3. A cathode ray beam tube comprising a cathode, a target, an anode for accelerating the electrons from said cathode toward said target, means for producing a magnetic focusing field between said cathode and said target normally focusing the electrons on said target, means for intercepting radio waves to produce an electric field perpendicular to said magnetic field, a second target around the first target and variably spaced therefrom to cause the number of electrons landing on the second target to vary with variation of the radii of their spiral paths around the lines of said magnetic field, and means for varying the strength of said magnetic field to equalize the frequency of rotation of the electrons around the magnetic lines with the frequency of the intercepted radio waves.

4. A cathode ray beam tube comprising a cathode, a target, an anode for accelerating the electrons from said cathode toward said target, means for producing a magnetic focusing field between said cathode and said target normally focusing the electrons on said target, means for intercepting radio waves to produce an electric field perpendicular to said magnetic field, means for tuning the second-mentioned means to the frequency of the radio waves to be received, a second target around the first target and variably spaced therefrom to cause the number of electrons landing on the second target to vary with variation of the radii of their spiral paths around the lines of said magnetic field and means for varying the strength of said magnetic field to equalize the frequency of rotation of the electrons around the magnetic lines with the frequency of the intercepted radio waves.

JAMES HILLIER.